United States Patent
Quan et al.

(10) Patent No.: US 8,644,680 B2
(45) Date of Patent: *Feb. 4, 2014

(54) METHOD AND APPARATUS FOR PROVIDING A CONTENT CONTROL SIGNAL IN A MEDIA PLAYER VIA COLOR BURST PHASE MODIFICATIONS

(75) Inventors: Ronald Quan, Cupertino, CA (US); John F. Cloutman, Tracy, CA (US)

(73) Assignee: Rovi Technologies Corporation, Santa Clara, CA (US)

( * ) Notice: Subject to any disclaimer, the term of this patent is extended or adjusted under 35 U.S.C. 154(b) by 327 days.

This patent is subject to a terminal disclaimer.

(21) Appl. No.: 12/563,050

(22) Filed: Sep. 18, 2009

(65) Prior Publication Data

US 2011/0069938 A1    Mar. 24, 2011

(51) Int. Cl.
*H04N 5/91*    (2006.01)
*H04N 9/80*    (2006.01)
*H04N 9/79*    (2006.01)

(52) U.S. Cl.
USPC ........................................................ 386/254

(58) Field of Classification Search
None
See application file for complete search history.

(56) References Cited

U.S. PATENT DOCUMENTS

| | | |
|---|---|---|
| 4,577,216 A | 3/1986 | Ryan |
| 4,626,890 A | 12/1986 | Ryan |
| 5,130,810 A | 7/1992 | Ryan |
| 5,583,396 A | 12/1996 | Hideaki et al. |
| 5,784,523 A | 7/1998 | Quan et al. |
| 6,222,978 B1 * | 4/2001 | Hirai .............................. 386/254 |
| 6,268,889 B1 * | 7/2001 | Koori ............................ 348/642 |
| 6,381,747 B1 | 4/2002 | Wonfor |

(Continued)

FOREIGN PATENT DOCUMENTS

| | | |
|---|---|---|
| WO | WO-96/36174 A2 | 11/1996 |
| WO | WO-96/36174 A3 | 11/1996 |
| WO | WO-2005/039176 A1 | 4/2005 |
| WO | WO-2005/039176 C1 | 4/2005 |

OTHER PUBLICATIONS

International Search Report mailed on Mar. 1, 2011, for PCT Application No. PCT/US2010/048292, filed on Sep. 9, 2010, five pages.

(Continued)

*Primary Examiner* — Hung Dang
*Assistant Examiner* — Sunghyoun Park
(74) *Attorney, Agent, or Firm* — Inventive Patent Law P.C.; Jim H. Salter

(57) ABSTRACT

The "color stripe" process is well known in the video field for preventing copying of video by analog video tape recorders, and operates by altering the phase of a portion of the video signal color burst. Here, a weakened version of the color stripe process is installed in a video signal by a digital media player which plays or stores conventional digital media, such as an optical disc (e.g., DVD or CD) player, a hard disc drive, a digital tape drive, or solid state memory. Thereby in an analog video signal output by such a digital media player the color burst phase alterations are reduced or attenuated so there is no copy prevention effect on a conventional downstream (receiving) analog video tape recorder. However the weakened color stripe process is still sufficient to be detectable by a suitable detector located in a downstream compliant device such as a video recorder, so the detected presence of the installed color stripe serves as an encoded indication of copy control or other content control for the video signal by the compliant device.

23 Claims, 7 Drawing Sheets

(56) References Cited

U.S. PATENT DOCUMENTS

| | | |
|---|---|---|
| 6,516,132 B1 | 2/2003 | Wrobleski et al. |
| 6,600,873 B1 | 7/2003 | Brill et al. |
| 7,039,294 B2 | 5/2006 | Quan |
| 7,050,698 B1 | 5/2006 | Quan |
| 7,395,545 B2 | 7/2008 | Wonfor et al. |
| 8,306,403 B2 | 11/2012 | Quan |
| 2003/0049016 A1 | 3/2003 | Wrobleski et al. |
| 2006/0083373 A1 | 4/2006 | Ryan et al. |
| 2006/0085863 A1* | 4/2006 | Ryan et al. ............. 726/30 |
| 2008/0151114 A1* | 6/2008 | Kotos ..................... 348/500 |
| 2008/0276325 A1 | 11/2008 | Quan |
| 2008/0309816 A1 | 12/2008 | Quan et al. |
| 2009/0202215 A1* | 8/2009 | Tan ......................... 386/34 |
| 2009/0205215 A1 | 8/2009 | Esslinger |
| 2011/0069938 A1 | 3/2011 | Quan |
| 2012/0159534 A1 | 6/2012 | Quan |

OTHER PUBLICATIONS

Written Opinion mailed on Mar. 1, 2011, for PCT Application No. PCT/US2010/048292, filed on Sep. 9, 2010, five pages.

U.S. Appl. No. 12/350,740, filed on Jan. 1, 2009, Cloutman et al.

U.S. Appl. No. 12/749,225, filed on Mar. 29, 2010, Quan et al.

International Search Report mailed on Jul. 27, 2010, for PCT Application No. PCT/US2010/020532, filed on Jan. 8, 2010, three pages.

Written Opinion mailed on Jul. 27, 2010, for PCT Application No. PCT/US2010/020532, filed on Jan. 8, 2010, four pages.

\* cited by examiner

METHOD AND APPARATUS FOR PROVIDING A CONTENT CONTROL SIGNAL IN A MEDIA PLAYER VIA COLOR BURST PHASE MODIFICATIONS

FIELD

This disclosure pertains to digital video recording storage and video content control.

BACKGROUND

Copy protection relates to modifying a video signal in such a manner that a conventional television receiver produces a normal picture from the modified signal, whereas a videotape recording made from the modified signal exhibits very annoying interference.

In the NTSC, PAL, and SECAM standard color television systems color information is transmitted on a subcarrier signal. In this case of the NTSC system the subcarrier has a frequency of about 3.58 MHz and in the case of the PAL system a frequency of about 4.43 MHz. In both systems the precise color at any point in the picture is determined by the phase of this subcarrier relative to some reference phase, while the degree of saturation of the color is determined by the amplitude of the subcarrier.

In order for a television receiver to correctly reproduce colors, the receiver requires information concerning the above-mentioned reference phase. This information is transmitted as part of the video signal in the form of a burst of about nine cycles of subcarrier following the horizontal synchronizing pulse, and is referred to as a color burst. This color burst signal is used in the television receiver to phase-lock a crystal oscillator, thus generating a continuous subcarrier signal at the reference phase which is then used to demodulate the color information. It is normal for the phase-locked crystal oscillator in the television receiver to have a fairly long time constant, on the order of a few milliseconds. The long time constant insures that the oscillator will ignore short term phase perturbations of the color burst signal as might be caused by noise.

SUMMARY

This disclosure pertains to video content control, and in particular, to the well known Macrovision Corp. "color stripe" (CS) process which is detected by signal detectors of the type often embedded in commercially available integrated chip sets used in video recorders or other Macrovision Corp. compliant video devices. It is known that such a color stripe detector is able to read or detect properly the Macrovision Corp. color stripe copy protection signals when an entire video color burst as described above is phase modified or when a majority of the color burst is so phase modified.

Such a color stripe signal, well known from Ryan U.S. Pat. No. 4,577,216 incorporated by reference in its entirety, is primarily a copy protection video signal, which is generally playable on a TV (television) set, and which causes an analog recording video cassette recorder (VCR) to play back a recorded signal with color errors. In the PAL TV system, synthesizing a playable color stripe signal with negligible display artifacts while providing an effective copy protection signal on a VCR or other video tape recorder is a challenge. For example, the more effective the color stripe signal is on a particular video tape recorder in preventing copying, the more likely that playability artifacts (on a TV display) are noticeable. Some PAL color stripe processes are not commercially viable because of such display artifacts, and thus not implemented.

In recent years with the decline in VCR sales or usage, newer video recorders such as digital personal video recorders have replaced the VHS (analog) video tape recorders. These digital video recorders use a different type of recording system, which includes a detection system as explained above for reading or detecting the incoming color stripe signal. Once a color stripe copy protection signal is detected in a video signal, a content control command is generated, such as "Prohibit Recording/Viewing". A compliant device can then accept the content control command to stop recording or to replace/mute the program video signal with another signal such as a blue screen. Brill et al., U.S. Pat. No. 6,600,873, incorporated by reference in its entirety, discloses how a device such as a video recorder includes special detection circuitry to detect the color stripe process and producing in response a control signal which disables the recorder, to prevent further recording. The same concept is embodied in commercially available integrated circuit video decoders which detect the color stripe process and in response issue commands to control operation (such as no recording) of a device such as a video set top box, personal video recorder or other in which the video decoder is installed. Such video decoders are generally referred to as "Macrovision compliant". Examples are the Texas Instruments TVP5146 video decoder and the Micronas AVF4910B video pixel decoder. See also Macrovision Corp. patent publication WO 2005/039176A1 disclosing use of analog copy protection to encode permitted use information, incorporated herein by reference in its entirety.

It is also known to provide a modified or weakened color stripe signal that is thus detectable, but not necessarily effective as a copy protection signal on a VCR or other video tape recorder. Ryan U.S. Pat. No. 4,626,890 and Quan et al. U.S. Pat. No. 5,784,523 both incorporated by reference in their entirety, further show ways to defeat the effects of color stripe signals by removing the incorrect phase in at least a portion or the whole of a color burst envelope. Normally one would conclude that by modifying a color stripe signal so as to defeat its color copy protection effects, the color stripe signal would also be not detectable in a compliant content control system. But it has been found that one or more "defeat" aspects of Quan et al. U.S. Pat. No. 5,784,523 can be applied to improve playability of a video signal on a TV display set while defeating color copy protection effects on a video tape recorder and still allowing color stripe detection in a compliant device (e.g., to cause the compliant device to prevent recording); see U.S. application Ser. No. 12/350,740, filed Jun. 8, 2009, Cloutman et al., incorporated by reference in its entirety.

The present disclosure further pertains to media players that play video from a digital medium and produce therefrom an analog signal video output which includes a weakened or defeated form of the color stripe process. Such media include optical disks (e.g., DVD or CD), magnetic media (tape or hard disk), and solid state memory devices (ROM, RAM, flash drives, media memory (SD, CF, memory stick, or the like). These media players play such media which also may include anti-copy bit(s) or signal flag(s), which when detected in the player, applies an appropriate analog content control signal. In prior implementations, the media players provided copy protection signals that were effective on downstream video recorders such as tape recorders. However, with the decline in use of analog video tape recorders (VCRs) and increased use of digital recorders, such copy protection signals for analog video tape recorders become less useful. To provide an effective copy protection signal for any video recorder, playability must be taken into consideration. So generally, those copy protection signals most effective on a VCR are not provided commercially because of playability problems. Thus, for a commercial process, an effective copy protection signal generally must have minimal playability artifacts. Thus media players provide an effective copy protection video signal while being acceptable in playability, and while being very effective in a downstream compliant content control device. A compliant content control device reads and/or senses the copy protection signal and provides commands to shut down the recorder, to limit recording use, etc. as explained above. However, an "effective" copy protection signal generally is "overkill" for a compliant device. Thus, a "weaker" or "defeated" copy protection signal will provide optimal playability while still providing effective content control, without regard to copy protection effectiveness on a VCR. One such copy protection signal is the color stripe signal described above, and a variant of this modified color burst signal is used for one or more embodiments here.

The "weakened" color stripe signal as described here may be combined with other video copy protection signal modifications such as AGC and/or pseudo sync pulses in a portion of the horizontal and/or vertical blanking interval, lowered portion of the front and/or back porch of a video signal, lower portion of an active field of the videos signal (e.g., included lowered portion of one or more TV lines of the program video signal, and/or lowered portion of one or more TV lines of any letter boxed region, or bordered region.), and/or sync modifications in amplitude, position, and/or width.

In one embodiment a digital media player receives a digital video signal (e.g., from a recorded or storage medium played by the player) which includes, e.g., APS (Analog Protection System) bit(s) or other control bit(s) (data or information) and couples the digital video signal to a reader or bit detector also part of the player (e.g., for APS, control, mode, and/or configuration of content control signal). The output signal of the reader or sensing circuit is then coupled to a generator or a programmable generator in the player to provide in response a weakened color stripe signal, which is generally not effective for copy protection on a downstream VCR but is effective when detected by a downstream content control device or compliant apparatus (e.g., an analog to digital converter, PVR—Personal Video Recorder, and/or display). Depending on the output of the sensing circuit or reader, the weakened color stripe signal may be enabled or disabled or modified. The weakened color stripe signal generally is synthesized in the player by a digital to analog converter and/or encoder circuit and coupled to the analog video output terminal of the media player.

In another embodiment a digital media player receives a digital video signal (from via a recorded or storage medium), which is coupled to a digital to analog converter (DAC) and/or encoder, wherein a generator or programmable generator is coupled to or part of the encoder and/or DAC, and wherein the output of the digital to analog converter provides the weakened color stripe signal. In this embodiment, no control bit or APS bit is required or needs to be read to activate the weakened color stripe signal applied at the analog output terminal of the media player.

In another embodiment includes a digital media player outputs the weakened color stripe signal in video signals also including program content that conform to, e.g., the 240p, 480I, 576I, PALN, PALNC, PALM, PAL, and/or NTSC television standards (not limiting). The media player may insert or add into the output video signals copy protection waveforms which are, e.g., AGC pulses, AGC and pseudo sync pulse pair signals, lowered portion of back porch, lowered portion of front porch, lower portion of one or more lines in the active TV field. The media player (e.g. based on a conventional DVD player or Blu-Ray player), when switched to the 1080I TV standard and/or to a progressive TV standard such as 480p, 576p, 720p, and/or 1080p, provides pseudo sync and/or AGC pulses (or positive going pulses in the VBI and/or HBI) in selected TV scan lines (via a DAC, pulse generator, and/or encoder circuit).

In yet another embodiment of the digital media player, a waveform (signal) generator circuit in the player provides waveforms including pseudo sync (synchronization) and/or horizontal sync pulses in a position, pulse-width, and/or amplitude modulated manner combined with a circuit or generator that synthesizes the weakened color burst signal.

Such media players, which output a weakened color stripe signal, may play digital media such as DVDs, Blu-Ray discs, HD-DVD discs, video tape, magnetic disk, and/or solid state memory devices. Examples of the media player thus include modified DVD players, Blu-Ray players, hard disc players, video tape players, and/or USB accessible solid state memory, built in solid state memory, and/or flash memory players (where the memory devices can be internal and/or externally accessed). In some media players, a combination to two or more readers or players may be present such as a video tape player in combination with a Blu-Ray or DVD player or memory device player.

Some such media players allow for external coupling via a USB or IEEE1394 or similar connection (e.g., Ethernet) for receiving a digital video program, which when converted to an analog video signal include the weakened color stripe signal. Another embodiment of the digital media player includes an external memory connection (e.g., USB or FireWire IEEE1394), LAN, and/or Ethernet to modify or update any of the analog copy protection waveforms mentioned while allowing the media player to include at its analog video signal output a weakened color stripe signal. In yet another embodiment the media player may reside in a computer and/or a display, which outputs an analog video output signal that includes a weakened color stripe signal.

The present modified or "weakened" or "defeated" color stripe signal may also be combined with other well known copy protection waveforms such as pseudo sync and/or AGC pulses. Also, one may combine the weakened color stripe signal with other copy protection methods such as sync narrowing, level shifting a portion of the video signal such as a lowered portion of a front or back porch region or an active field (e.g., when compared to another portion of the video signal such as a portion of the vertical blanking interval).

One may generate two or more types of defeated or weakened color stripe signals such that when combined with other waveforms, different types or levels of copy protection can be identified such as the well known Macrovision Corp. Type 2 or Type 3 or Type n. A Type n copy protection signal can be linked to the well known APS (analog protection system) trigger bits that are used in video media players such as DVD players and/or television set top boxes or the like.

One may provide a segmented weakened color stripe signal that is detectable by a detection system, but does not show appreciable color copy protection effectiveness on a video tape recorder.

One may provide a weakened color stripe signal color burst modification which also has an extended color burst envelope. For example, a normal color burst includes about 8 to 10 cycles of subcarrier frequency (e.g., 4.43 MHz). Embodiments of the invention include greater than 10 cycles of subcarrier for the color burst modification.

One may include generally more subcarrier cycles of substantially normal phase than cycles of incorrect phase in the weakened color stripe signal (e.g., the color stripe signal is reduced or weakened in providing the above described color copy protection effects to a (PAL) standard video tape recorder). In Wrobleski et al. U.S. Pat. No. 6,516,132 incorporated by reference in its entirety, a color stripe signal with improved playability but which is copy prevention effective is provided having at least equal or more in number of subcarrier cycles of incorrect phase compared to the number of subcarrier cycles of correct (normal) phase. Commercially available color stripe detectors, as referred to above, by design do detect this type of color stripe signal. In one example, in U.S. Pat. No. 6,516,132 two cycles of added incorrect phase form an extended color stripe color burst envelope to provide an effective color copy protection signal to a VCR, and to afford detection by such color stripe detectors.

Embodiments thus utilize color stripe modifications of the general type shown in U.S. Pat. No. 6,516,132 where segmented (partial) color burst modifications provide a reduced or defeated or weakened copy protection effect by generally providing a color burst with fewer cycles of incorrect color burst phase than those with correct (normal) phase. One or more of this type of color burst modifications which is weakened is detectable in a commercially available color stripe reader/detector. In an example, two subcarrier cycles of normal (correct) phase are added to the color burst to form an extended color stripe color burst envelope to provide reduced or defeated color copy protection effectiveness on a VCR, and also to still provide color stripe detection for content control purposes.

For example, in one version of a "defeated" color stripe PAL signal (e.g., a two video line color stripe color burst signal with more cycles of normal phase than incorrect phase), which was recorded, negligible color stripe effects were observed upon playback of the video by a VHS type VCR. Yet this "defeated" color stripe PAL signal was detected successfully (as a color stripe signal) by an available Macrovision Corp. compliant video decoder.

The weakened or defeated color stripe signal may be combined with any known copy protection enhancement signal (e.g., level shifting a portion of the video signal or any waveform described in Wonfor et al. U.S. Pat. No. 5,583,936 incorporated by reference in its entirety) any part of a basic copy protection signal such as AGC and/or pseudo sync pulses, and/or any modification in one or more sync signals (e.g., sync amplitude, sync level shifting, sync width modification, and/or sync position modification).

DETAILED DESCRIPTION

Figure 1A:
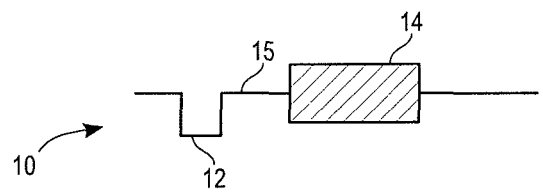
FIG. 1A shows in the prior art an effective copy protection color stripe signal.

FIG. 1A shows a prior art video waveform 10 which is a mostly conventional TV horizontal blanking interval having horizontal sync pulse 12, color burst 14 and breezeway 15 but wherein 8 to 10 subcarrier cycles of the color burst 14 (indicated by the hatching) are modified in phase to about 180 degrees from the normal (conventional) phase. Conventionally the horizontal axis is time and the vertical axis voltage. Ryan U.S. Pat. No. 4,577,216 incorporated herein by reference in its entirety teaches that a number of horizontal lines of a video signal with this type of modified color burst 14 yields effective copy protection when applied to a video tape recorder. The hatched color burst 14 denotes the incorrect (modified) phase (also referred to as phase angle) such as a departure of 180 degrees from the normal color burst phase angle of zero degrees of a color video signal for these subcarrier cycles.

Figure 1B:
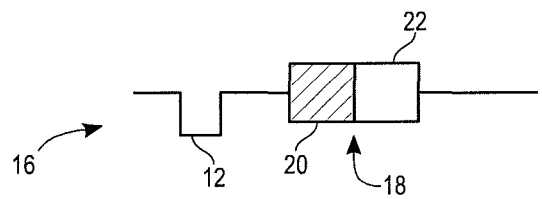
FIG. 1B shows in the prior art a copy protection effective split burst (segmented) color stripe signal.

FIG. 1B, also showing a prior art waveform 16, is a variation of FIG. 1A in which at least half the cycles of an entire color burst envelope 18 are shifted so as to have an incorrect burst phase. In this example, the color burst envelope 18 is a "split" (segmented) color burst illustrated as a hatched portion 20 of incorrect phase and a second portion 22 of correct phase. For an effective copy protection signal to produce noticeable color distortion when recorded by a VCR, at least half of the total burst envelope 18 duration is modified to the incorrect phase 20. For example, the duration of the hatched incorrect portion 20 is equal or greater than the correct portion 22 in burst envelope 18. Such a waveform may also include an extended color burst envelope 18 wherein cycles of preferably incorrect phase start ahead of a normal color burst envelope, as explained below.

Figure 1C:
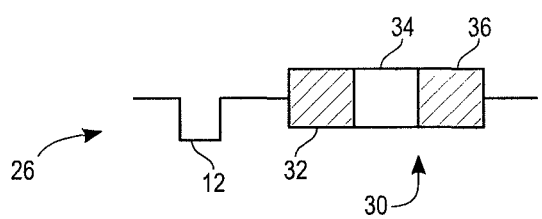
FIG. 1C shows in the prior art another effective split burst copy protection signal.

FIG. 1C shows another variation of FIG. 1A, which provides an effective (in terms of copy prevention) color copy protection signal 26 to a video recorder. In this example, the color burst envelope 30 is segmented (split) into three (or more) portions 32, 34, 36. Again, the hatched areas 32, 36 denote incorrect color burst phase while middle portion 34 denotes normal color burst phase. In general, as long as there are more subcarrier cycles of incorrect phase than normal or correct color phase, the modified color burst 30 provides an effective copy protection signal. Here the total duration or number of subcarrier cycles of the portions 32, 36 is greater (or equal) than the middle portion 34 to provide an effective color stripe signal.

Figure 2A:
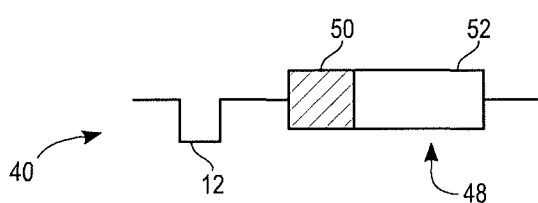
FIGS. 2A and 2B show "defeated" color stripe signals used in accordance with the invention.

FIG. 2A illustrates a weakened color stripe waveform 40 used in an embodiment of the invention. (FIGS. 2A to 9 are the same as in U.S. application Ser. No. 12/350,740.) Here modified color burst 48 has fewer cycles of incorrect phase angle in section 50 than cycles of correct phase angle in section 52. While this type of modified burst 48 is disclosed in Quan et al. as a way to defeat or reduce copy protection effectiveness or to improve on playability effects, the present inventors have found that this "defeated" or weakened color stripe signal is still detectable by commercially available color stripe detectors of the type described above.

Although the color stripe incorrect phase angle may be in the range of 20 degrees to 180 degrees (normal phase angle being 0°), in some examples a phase of about 180 degrees for the incorrect burst phase portion is preferable to a smaller phase shift. For example, in some PAL TV displays (TV sets or monitors), providing a modified phase of 90 degrees causes more noticeable playability artifacts than a modified phase of 180 degrees. When choosing an incorrect subcarrier phase from 20 to 180 degrees, intuitively it would seem that a phase angle less than 180 degrees would cause less playability artifacts (display problem). Thus it would seem that 90 degrees of phase shift would cause fewer display problems than 180 degrees of phase shift. Experimentally, it has been found that 180 degrees of phase shift for a color stripe burst, whether for a weakened or effective copy protection color stripe, actually causes less or fewer display artifacts than a 90 degree phase shifted color burst. So preferably, a weakened version of the color stripe here has in one embodiment 180 degrees of phase shift.

Figure 2B:
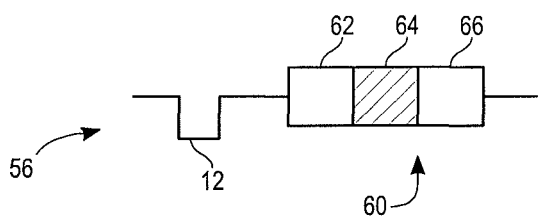

In another variation of such a defeated or reduced effectiveness copy protection signal, FIG. 2B shows a video signal 56 having a modified color burst 60, which as in FIG. 1C is a segmented (split) color burst. In this example of three segments 62, 64, 64 in the modified color burst signal 60, the number of incorrect phase subcarrier cycles is again less that the total number of correct phase subcarrier cycles. For example, the summed duration of the first and third segments 62, 66 with normal phase angle subcarrier cycles exceeds the middle segment's 64 duration, wherein the middle segment 64 includes the incorrect phase angle cycles.

Figure 2C:
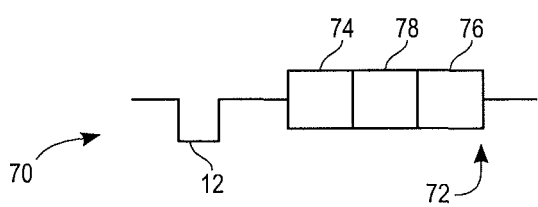
FIGS. 2C to 2F show additional defeated color stripe signals.

FIG. 2C shows a video signal 70 having a weakened and segmented color burst 72 wherein incorrect phase angle color burst subcarrier cycles are in segments 74, 76, 78, and wherein correct phase angle color burst phase subcarrier cycles are in modified color burst segments 74, 76, 78 such that there are more subcarrier cycles of correct phase angle than incorrect phase angle. In some instances, the segment(s) that would include correct phase angle cycles may be blanked or attenuated. In other instances, the cycles of incorrect phase angle may have a lower amplitude level/magnitude than the correct phase angle cycles. Hence in an embodiment of the invention, it is possible to have more subcarrier cycles of incorrect phase angle than subcarrier cycles of correct phase angle, provided that one or more incorrect phase angle subcarrier cycles is sufficiently attenuated (e.g., reduced in amplitude, or blanked).

For example in general, the modified color burst 72 may include segments 74, 76, 78 with set (or programmed) amplitude, position, and/or phase angle. This means that each segment or section can be programmed in terms of amplitude, position or phase switch point, and/or phase angle such as 180 degrees. Color burst 72 represents a generic signal that can be provided in any Macrovision Corp. compliant (certified) integrated circuit for DVD players, etc.

Figure 2D:
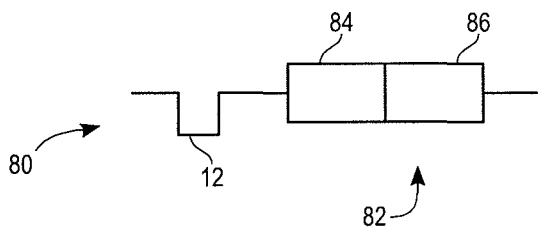
Figure 2E:
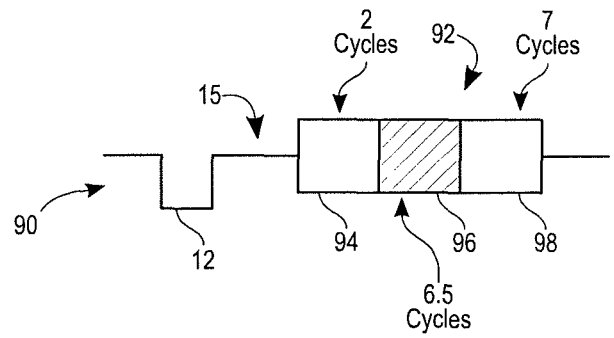
Figure 2F:
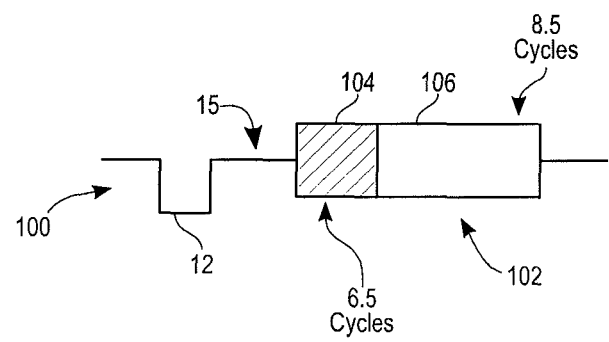

Similarly, in FIG. 2D for a video signal 80 having a two segment modified color burst 82, there are segments 84, 86. The position and/or duration of segments 84, 86 may be defined. This means that the phase transition or phase switch point in the split burst may be moved or varied in position, and that number or subcarrier cycles within each segment may be set to a specific number or cycles to provide a duration in each section of the modified color burst signal. So in one embodiment as described above, segment 84 may include "M" number of cycles of incorrect phase angle followed by segment 86 with "N" number of cycles of correct phase angle (or vice versa), where preferably, N>M. Segment 84 may include cycles of subcarrier advanced or before the start of a normal burst envelope (e.g., include cycles of subcarrier in at least a portion of a breezeway after a trailing edge of a sync pulse or modified sync pulse). FIGS. 2E and 2F are specific examples of the weakened color stripe signal, whereas FIGS. 2C and 2D are general examples.

FIG. 2E shows an embodiment similar to that of FIGS. 2A to 2D for PAL (or NTSC) TV standard video. For a video signal horizontal blanking interval 90 having a 4 or more line (per band) colorstripe signal in color burst 92, in segment 94 two cycles of normal phase angle are followed by a segment 96 having 6.5 cycles of incorrect phase angle, followed by segment 98 with 7 cycles of correct phase angle. Note that the number of cycles per color burst may be varied within +/−10%. Here segment 94 may extend into the breezeway 15.

FIG. 2F shows another embodiment for PAL (or NTSC) TV standard video for a video signal 100 having color burst 102 wherein a two or more horizontal line (per band) colorstripe signal has 6.5 subcarrier cycles of incorrect phase angle in segment 104 extending into the breezeway 15 followed by 8.5 cycles of correct phase angle in segment 106. Note again that the number of cycles may vary within +/−10%. Here segment 104 may extend into the breezeway 15.

Figure 3:
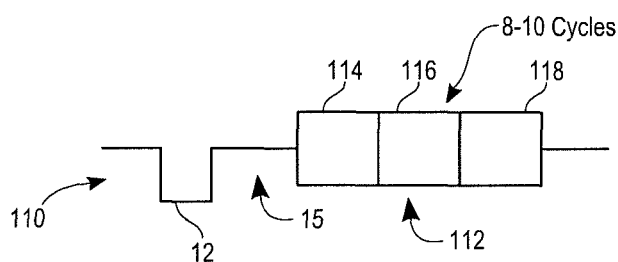
FIG. 3 shows a prior art color burst of normal phase and modified duration.

FIG. 3 shows for video signal 110 an extended color burst 112 with segment 116 having correct phase angle, wherein a segment 114 of several cycles of correct phase angle is added in the breezeway area 15 and a segment 118 is added extending after the normal burst envelope 116 for at least some of the non-colorstripe TV horizontal lines, in accordance with the invention. By extending the duration of the burst envelope with correct phase angle, playability may be improved. For instance, when combined with colorstripe signals that have extended burst duration, color burst duration may be extended (e.g., with cycles of incorrect and/or correct phase angle) in the examples of FIGS. 2A, 2B, 2E or 2F.

Figure 4:
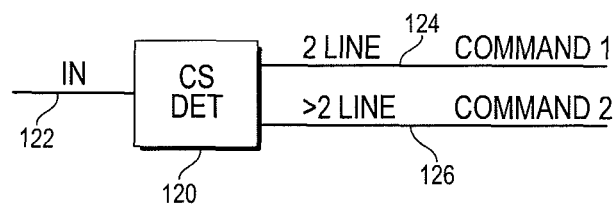
FIG. 4 shows a color stripe detector in accordance with the invention.

FIG. 4 shows a generic example of a color stripe (CS) detector 120 which senses color stripe waveforms in accordance with the invention which are applied at input terminal 122 and which outputs in response one or more (command) signals on terminals 124, 126. Detector 120 may be implemented a number of ways including as a phase detector (e.g., multiplier) or a burst continuation circuit, as explained in more detail below. The burst continuation circuit provides internally a substantially normal phase angle signal to be compared with the phase angle modifications of the input waveforms. The resulting (e.g., command) signals on terminals 124, 126 may for example, be a particular bit (digital) pattern signal "Command 1" when a weakened two line color stripe signal in accordance with the invention is read (detected). When a greater than two line weakened color stripe signal is read, a similar or different bit pattern signal "Command 2" may be generated. In FIG. 4 for example, when a two line weakened color stripe input signal is sensed, the "Command 1" signal is output, which can then control a device to add or encode or re-encode on the well known "Type 2" Macrovision Corp. compliant signals for copy control. Such a Type 2 signal would include or encode or re-encode a same (weakened or non effective) or different (an effective) color stripe signal and/or one or more of the following copy protection signals:
1) AGC pulses and/or Back Porch Pulses
2) Lowered portion of an active field
3) Pseudo sync pulses
4) N line color stripe signal Similarly for a greater than two line weakened color stripe input signal that is detected, the "Command 2" signal output on terminal 120 may produce the well known Type 3 Macrovision Corp. APS signal including the same or different color stripe signal as mentioned above and/or any of waveforms 1-4 listed above. An effective color stripe signal may include more cycles of incorrect phase angle than cycles of correct phase angle in a horizontal blanking interval, which may include an extended horizontal blanking interval.

Command 1 or 2 may direct a downstream device to mute, switch signal source, or shut down (e.g., upon sensing any of the "defeated" color stripe waveforms).

Figure 5:
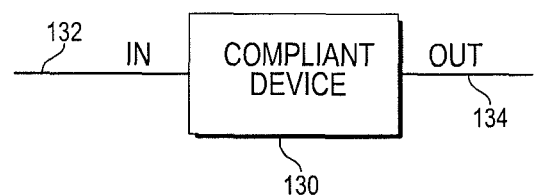
FIG. 5 shows a generic Macrovision compliant device which senses one or more video signal modifications.

FIG. 5 shows a typical compliant device 130 such as a video recorder, analog to digital converter, or video display device having video input terminal 132. Such a device 130 includes a detector 120 as in FIG. 4, and when any waveform in accordance with the invention is sensed, device 130 responsive to the detection stops recording, stops outputting a program video output, scales the video signal, and/or ceases to display the program video. Device 130 may re-encode, upon sensing any of the weakened color stripe signals (in any combination of basic copy protection signals and/or enhancement signals), a similar or different copy protection signal of like resolution (or like TV standard) or different resolution (or different TV standard) and output the resultant signal on terminal 134.

Figure 6A:
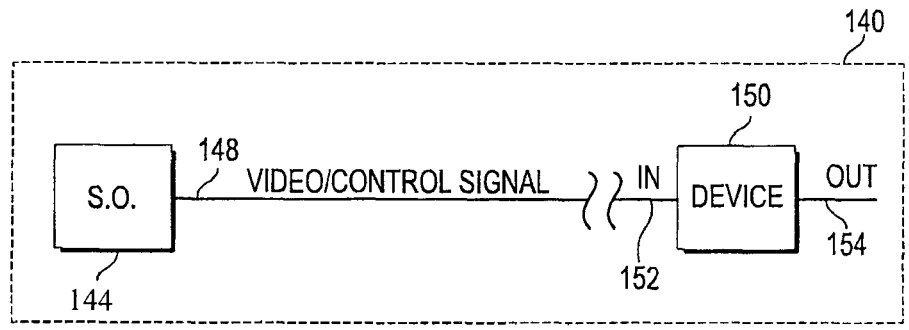
FIG. 6A shows an example of a system operator enabling or controlling one or more video signals in accordance with the invention.

FIG. 6A shows an example of a cable or satellite television distribution system 140 including a system operator (S.O.) 144 that provides or transmits video and control (analog or digital) signals via communications channel 148 to a customer video device 150 (e.g., a set top box, PVR, tuner, display, cell phone, etc.). Channel 148 may be wireless, wired, cable, satellite, WiFi, WiMax, and/or the Internet. The signals on channel 148 may include program video and one or more control bits, bit pattern(s), or programming bits. Upon reception of these signals at terminal 152, remote video device 150 outputs the above described weakened color stripe waveforms when enabled by the control or programming bits or bit pattern(s) sent by system operator 144. Alternatively, device 150 may default to output one or more waveforms in accordance with the invention with or without the system operator transmission of the control or programming bits via channel 148 coupled to input terminal 152 of device 150. The output signal of device 150 at output terminal 154 is typically analog video including one or more weakened color stripe waveforms in accordance with the invention, which may be combined with any copy prevention signal such as pseudo sync pulses, AGC pulses (e.g., in a portion of the horizontal and/or vertical blanking interval), sync modification (e.g., sync reduction, sync level shifting, sync width narrowing/widening, sync position/shifting), and/or level shifting a portion of the video signal. In FIG. 6A the signal on channel 148 is generally a digital signal used in a digital delivery network such as a digital TV set top box without recording capability. FIG. 4 in contrast depicts a detector 120 which is generally used in a device that includes an analog input such as a recorder. This recorder would normally inhibit recording the program video upon detection of the analog weakened color stripe signal. Device 150 in FIG. 6A may include an analog input terminal (not shown), so then device 150 would include the apparatuses of FIGS. 4 and 5, a color stripe detector and recording device. Generally if a compliant device has an analog input terminal, it would include a detection system such as in FIG. 4, and also a compliant recording system as in FIG. 5. So there are actually some digital devices (e.g., a version of device 150) that can be connected to a digital network, where such devices include a recorder, and also accept one or more analog inputs. FIG. 6A thus is an example of how the weakened color stripe signal can be used in a digital delivery network, such as described in Wonfor et al. U.S. Pat. No. 6,381,747.

Figure 6B:
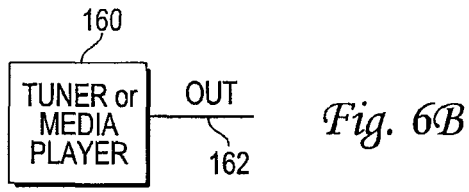
FIG. 6B shows an example of a playback or receiving device enabling, controlling, or providing one or more waveforms in accordance with the invention.

FIG. 6B shows an example of a media player or PVR, tuner, receiver, cell phone, digital media center, set top box, etc. 160 which outputs analog video on line(s) or terminal 162 including one or more color stripe waveforms in accordance with the invention, which may be combined with any pseudo sync, AGC pulses (e.g., in a portion of the horizontal and/or vertical blanking interval), sync modification (e.g., sync reduction, sync level shifting, sync width narrowing/widening, sync position/shifting), and/or level shifting a portion of the video signal. FIG. 6B thus represents various devices that may be connected to a system operator as in FIG. 6A, or a video delivery network not using a system operator as in FIG. 6A. For instance, the video can be sent via a home computer network.

Figure 7A:
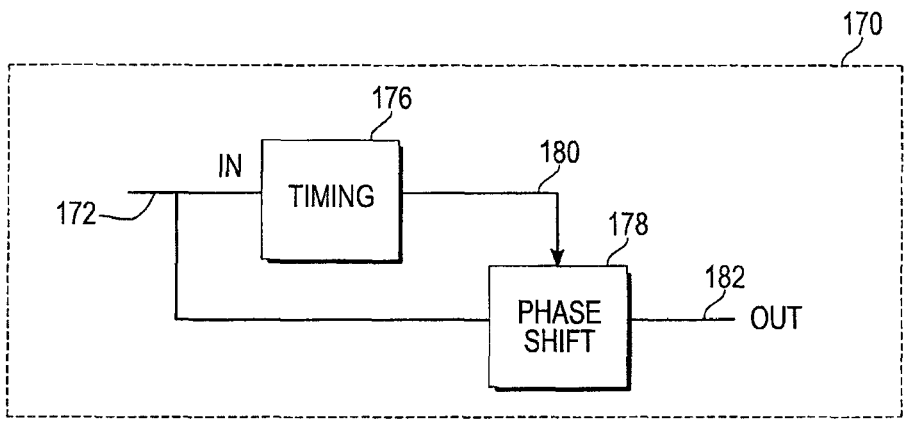
FIG. 7A shows an apparatus to provide one or more waveforms in accordance with the invention.

FIG. 7A shows in a block diagram an example of a generator apparatus 170 to generate weakened color stripe signals in accordance with the invention. The apparatuses of FIG. 7A or 7B or an equivalent circuit/system is present in device 150 or device 160 of FIGS. 6A, 6B. A conventional video signal is coupled to input terminal 172, which is coupled to a timing circuit 176. Timing circuit 176 provides a signal (that may be programmable by one or more control bits, not shown) for selected TV horizontal lines and pixels for a modified color burst. The video signal at input terminal 172 is then provided with a color burst signal that is phase shifted by phase shift or phase generating circuit 178 according to the timing output from timing signal circuit 176 on line(s) 180 to provide at output terminal 182 one or more waveforms of weakened color stripe. Phase shift circuit or phase generating circuit 178 may provide or insert a color burst of modified phase and/or duration for one or more segments of the color burst envelope as explained above. The video signal input at terminal 172 may be analog or digital.

Figure 7B:
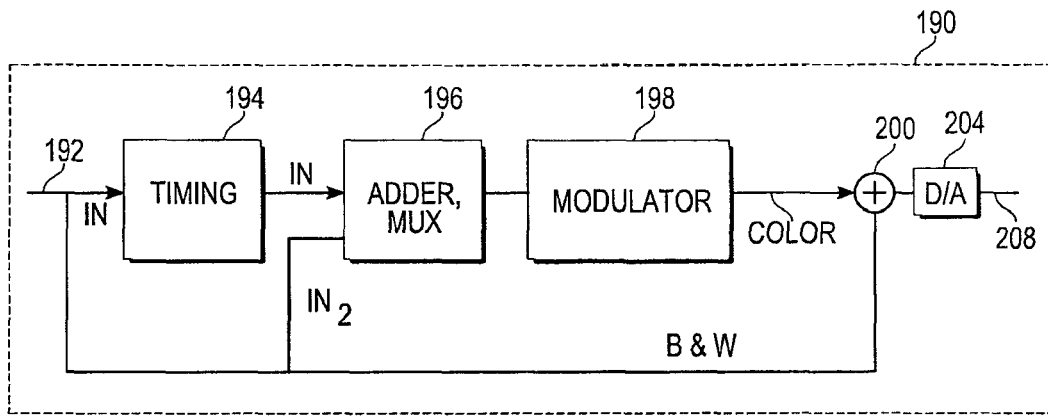
FIG. 7B shows another apparatus to synthesize or provide one or more waveforms in accordance with the invention.

FIG. 7B shows in a block diagram another generator apparatus 190 to generate such weakened color stripe waveforms. The input video signal is coupled to input terminal(s) 192. The video signal is thereby coupled to a timing circuit 194 and the output of timing circuit 194 provides a signal coincident with selected lines and pixels of the video signal for color burst modification. The output of timing circuit 194 is coupled to one input ($IN_1$) of a switching, multiplexing (MUX), inserting, or adding circuit 196. A second input ($IN_2$) to adding circuit 196 is from the video input terminal 192. The output signal from adding circuit 196 then has a modified portion of the horizontal blanking interval and is coupled to a (subcarrier) modulator (e.g., multiplier) circuit 198 to provide a color burst of modified phase, amplitude, position, and/or duration as described above.

Typically the input signal to terminal(s) 192 is a digital component waveform having Y, Pr, Pb component video or the like. The Y component signal is denoted as the black and white video signal (B&W) which is summed by adder 200 to a modulated color signal (via modulator 198) including one or more color burst modifications to provide a composite (digital TV) signal. A digital to analog converter 204 then provides an analog video signal at output terminal 208 that includes one or more color burst modifications in accordance with the invention. It is to be understood that an apparatus as in FIGS. 7A, 7B may be included in a video processor/encoder also performing other functions.

Figure 8:
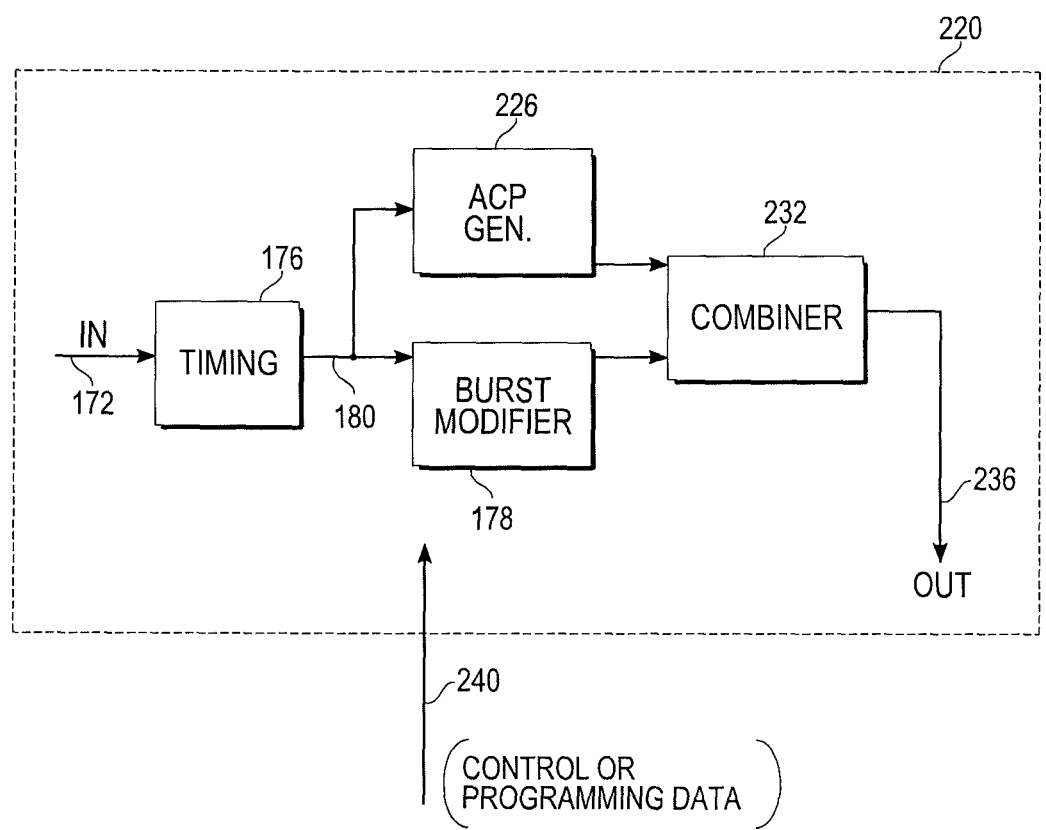
FIG. 8 shows an apparatus to provide one or more waveforms and/or one or more basic copy protection signals or enhancement signals.

FIG. 8 shows in a block diagram a typical apparatus (e.g. an integrated circuit or portion thereof) 220, which allows one or more of the present color burst modifications to be combined with one or more basic copy protection signal(s) and/or enhancement signal(s) and is based on the FIG. 7A apparatus. A video signal is coupled to input terminal 172. Timing circuit 176 outputs signals as in FIG. 7A indicating selected lines and pixels for the color burst modification signal, and outputs signals in selected lines and pixels for providing ACP (copy protection) signals, which include:

1) Sync modification(s) such as sync reduction, sync level shifting, sync pulse width, sync amplitude, and/or sync position.
2) One or more pseudo sync pulses in an overscan area.
3) One or more AGC pulses in an overscan area
4) Modulation (e.g., amplitude, frequency, position, pulse-width) of AGC, sync, and/or pseudo sync pulse(s).
5) Level shifting a portion of the video signal.

The output signals of the ACP signal generator 226, and burst modifier (e.g., phase shift or phase generator) circuit 178 are coupled to a combining circuit 232, which outputs a digital and/or analog signal with one or more color burst modifications in accordance with the invention, and which at the output terminal 236 may include any of the ACP signals mentioned above. Configuring, enabling, and/or disabling any of the signals mentioned (ACP and/or color burst modification) may be via a control signal or bit pattern applied at terminal 240. Thus, the (control) signal at 240 includes one or more bits or a bit pattern (e.g., from a system operator, a memory device, storage device, media, etc.).

Figure 9:
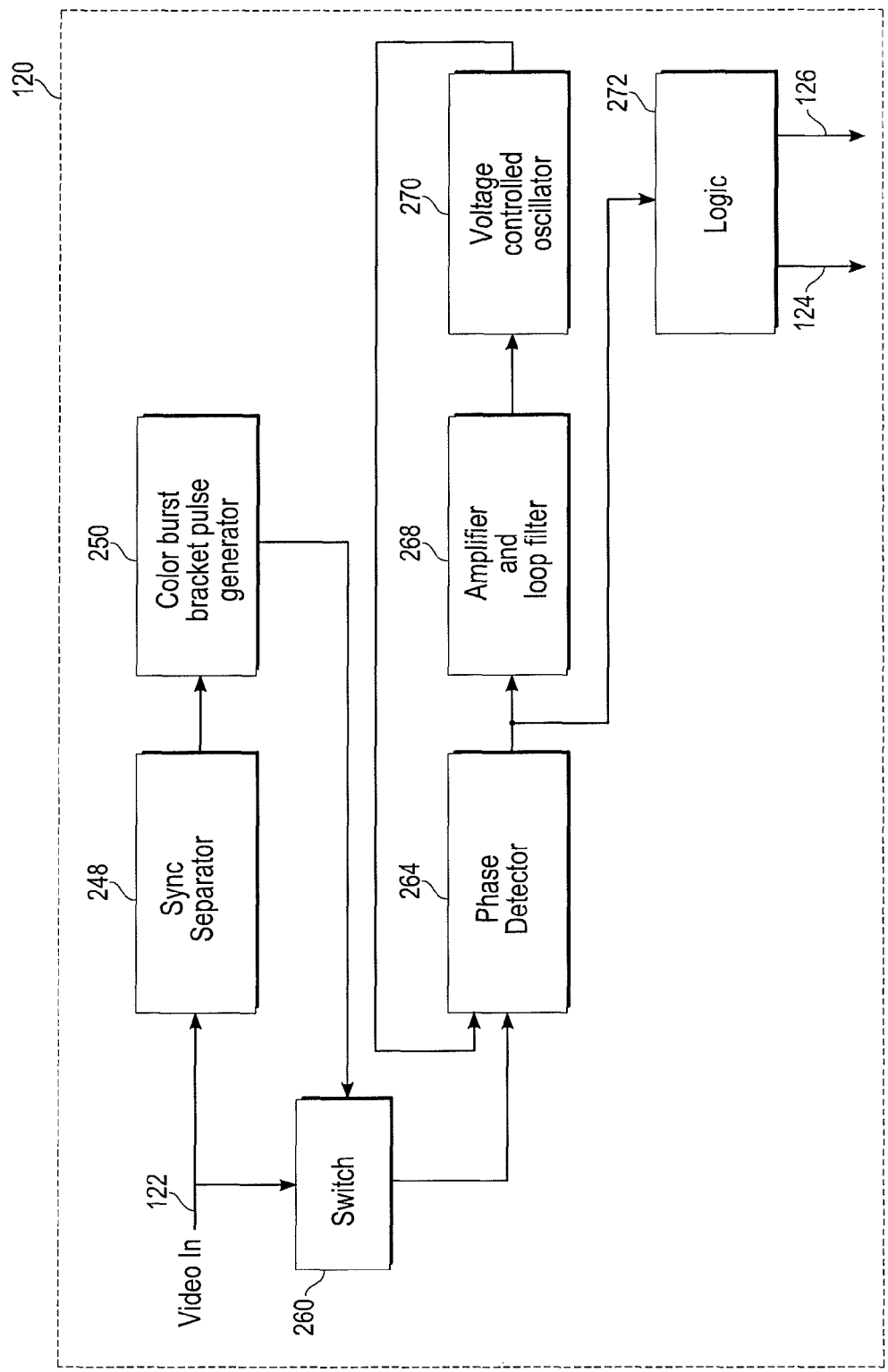
FIG. 9 shows detail of an apparatus as in FIG. 4 to detect waveforms in accordance with the invention.

FIG. 9 shows in a block diagram detail of an exemplary weakened or defeated color stripe detector 130 of FIG. 5, and which is somewhat similar to that of Brill et al. U.S. Pat. No. 6,600,873 referred to above Like the other devices referred to herein, this may be embodied in its entirety or in part as an integrated circuit. Detector 120 has video input terminal(s) 122 coupled to sync separator 248 to separate out the synchronizing pulses in the input video. The extracted sync pulses drive color burst bracket generator 250 which is, e.g., a mono stable multivibrator outputting a signal of at least 1 μsec duration. The output signal of generator 250 is coupled to the control element of switch 260. Switch 260 thereby couples the input video to phase detector 264 during the expected duration of the color burst. The output of phase detector 264 is coupled to amplifier and loop filter 268, in turn coupled to VCO 270. The output of VCO 270 is coupled to a second input terminal of phase detector 264 to provide a phase lock loop circuit. VCO 270 provides a continuous signal that is phase locked to the average phase of all incoming color burst signals, wherein the majority of color burst signals are of normal phase. Phase detector 264 outputs an indication of incorrect phase to logic 272 which determines, based on the incorrect phase indications, the presence/absence of various versions of the color stripe process and outputs suitable commands on terminals 124, 126 as in FIG. 5. Further, a monostable multivibrator circuit is a type of a timing circuit useful here, as is any type of equivalent circuit such as a (digital) counting circuit to generate a timing pulse.

Figure 10:
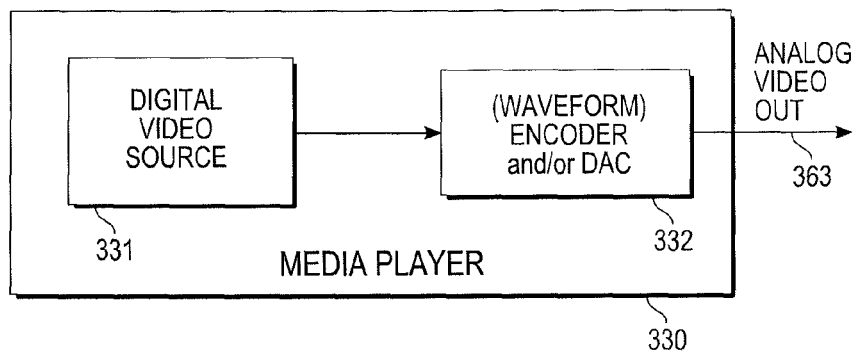
FIGS. 10, 11, 12, 13 each show an example of a digital media player which outputs the present copy protection signals.

FIG. 10 illustrates in a block diagram an embodiment of a digital media playback device (also referred to as a digital media player) 330 including a (conventional) digital video source 331. Video source 331 is essentially the same as a (conventional) media player as described above. Also included in player 330 is an encoding circuit and/or digital to analog converter (DAC) 332 for providing a video analog output signal including one or more of the waveforms (i.e., the copy protection signals) described above which are a weakened color stripe signal, or provide improved playability in a copy protected video signal in accordance with the invention. Video source 331 thus may include a conventional recorded medium played on a conventional magnetic drive (e.g., tape and/or disc), a conventional solid state memory device (e.g., flash drive, compact memory card, memory card, SD card, memory chip(s)), and/or conventional optical disc playback device such as a CD, DVD or Blu Ray player. The encoder and/or DAC (digital analog converter) 332 is coupled to the video source 331 and outputs an analog video signal including one or more of the copy protection waveforms described above, thereby to provide a copy protected video signal and/or weakened color stripe signal at output port 363. This copy protected video signal may be "on" by default (e.g., any of the present copy protection signals can be provided in the output signal of the media player 330 at all times) or turned on by one or more control bits (a command) provided from within the video source 331 or by internal or external signal(s). The DAC would be used in those embodiments where the digital video source itself outputs an encoded signal or other signal already containing a content control or copy protection signal.

Such control bit(s) may select one or more copy protection waveforms or video signal modifications at video output port 363. For instance, in a 525 or 625 scan line TV system, one or more weakened color stripe signals is added to a portion of the video signal (e.g., for the apparatuses of FIGS. 10, 11, 12, and/or 13) to provide a negligible color distortion effect on a VCR or TV, while causing a downstream (receiving) compliant device/recorder to receive and detect the weakened color stripe signal and thereby for example cause the compliant device or recorder to inhibit recording, limit recording time, limit the number of recordings, provide a time window for recording, and/or provide enhanced or degraded video and/or audio quality.

Figure 11:
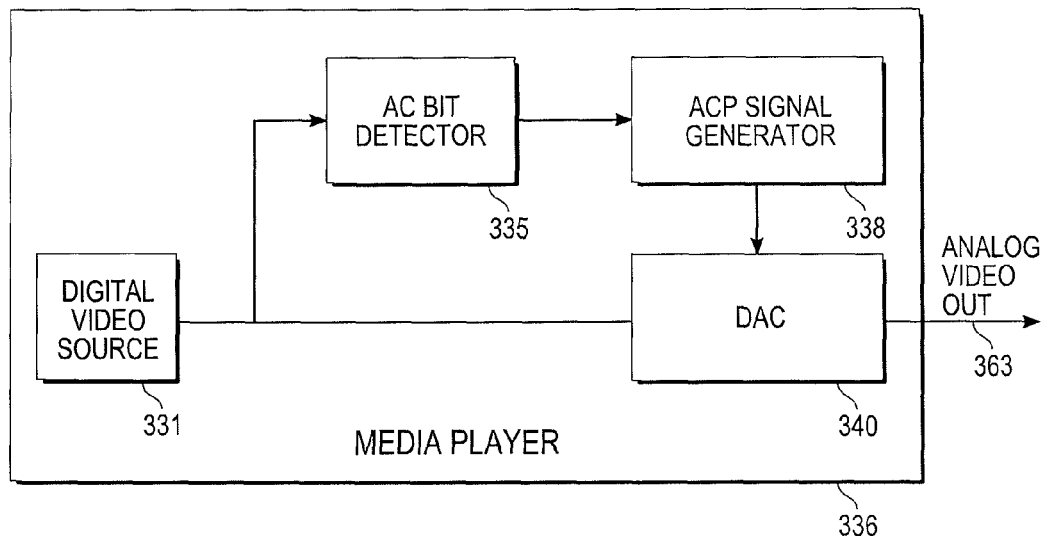

FIG. 11 illustrates a second embodiment of a media player 336 that includes a copy protection bit detector, here an AC (anticopy) bit detector 335. Here the AC bit detector 335 reads or senses a digital bit stream in the digital video signal received from the video source 331. For example, upon sensing one or more such bit(s) in the output of video source 331 the AC bit detector 335 sends a command or signal to a copy protection signal generator 338 to provide one or more copy protection signals, signal modifications as mentioned above, to a DAC (digital to analog converter) 340. DAC 340 in response outputs an analog copy protected video signal at video output port 363, which includes copy protection signals and/or weakened color stripe signals, and/or provides improved playability of the copy protected video signal. Note that DAC 340 is also coupled to the video source 331 to convert the original digital video signal to analog form.

Figure 12:
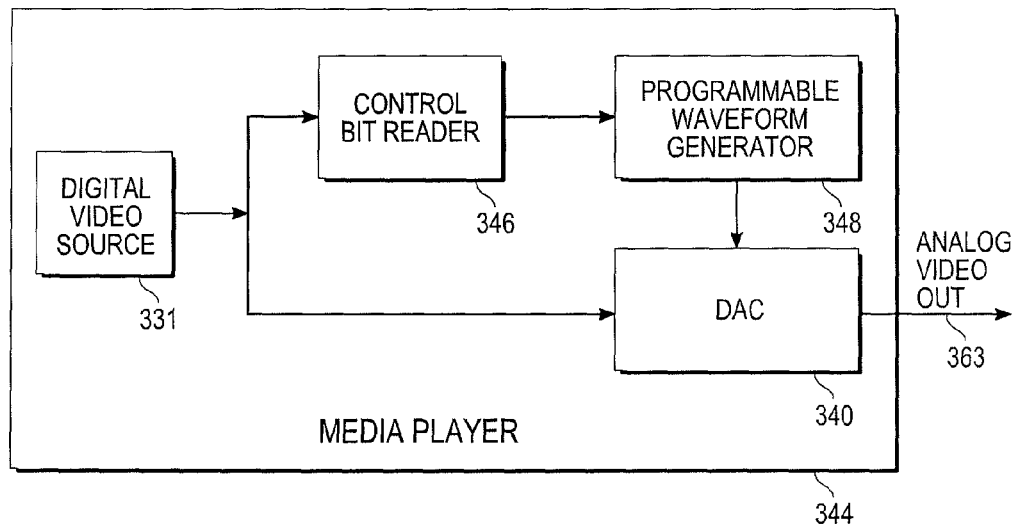

FIG. 12 illustrates a third media player 344 similar to the media player of FIG. 11, but with more flexible programmability of the copy protected video signal. Video source 331 is coupled to a control bit(s) reader/sensing circuit 346, which provides typically one or more signals to program various parameters of the copy protected video signal. Circuit 346 is coupled to control a programmable waveform generator 348 which thereby provides the flexibility for a user to program one or more copy protected video signals and/or weakened color stripe signals. The digital output signal of generator 348 is coupled to an encoder and/or DAC 340. The encoder is used in those embodiments where the weakened color strip signal may require the encoder to provide a modulated subcarrier in the digital domain. The DAC 340 provides a weakened color stripe signal in the analog domain at analog video output port 363. For copy protected signals generally the AGC or pseudo sync pulses or other luminance signal modifications from generator 348 can be coupled directly to the DAC. Also DAC 340 is also coupled to the video source 331 (e.g., a playback mechanism or media reader). The analog output video signal of DAC 340 thereby includes a copy protected waveform and/or a weakened color stripe signal with programmability, and/or DAC 340 provides improved playability (e.g., a weakened color stripe signal that is ineffective on a VCR thereby provides improved playability over an effective color stripe signal) of the copy protected or content control video signal.

Such programmability, for example via the waveform generator 348, includes using conventional APS (Analog Protection System) bits to implement an APS defined Type-n signal. For instance, a Macrovision Corp. Type 1 APS signal may include pseudo sync pulses in selected TV lines. (An APS command conventionally generates a Type 1 or Type n signal. So the Type 1 signal must be tied to a particular APS bit pattern.) A Type 1 signal may include copy protection such as sync pulse amplitude reduction in selected TV lines, lowered horizontal blanking interval front porch level in selected TV lines, and/or lower back porch level in selected TV lines.

A Type 2 (copy protected video or content control) APS signal may include a Type 1 signal with a first type of color burst modification (CS) (e.g., partial, full or split burst weakened color stripe signal). Or an APS Type 3 signal may include a second type of color burst modification (CS) signal (weakened color stripe signal) along with a Type 1 signal. Note that a Type 2 signal may have an "M" TV scan line weakened color stripe process. A Type 3 process may have an "N" TV scan line weakened color stripe process (or vice versa). For example M<=2, N>=3.

Such programmability, accomplished for example via the waveform generator 348, may include programming the TV line assignment of the pseudo sync pulses, the number of pseudo sync pulses per line, the position of pseudo sync pulses, and/or the width of pseudo sync pulses. Programmability may include a negative or positive voltage level to be assigned selected TV lines for front and/or back porch region(s) of video line horizontal blanking intervals. U.S. Pat. Nos. 5,583,936 and 7,050,698 relate to adding or inserting an amplitude lowering signal in the front and/or back porch area; both are incorporated by reference in their entireties.

For a color burst modification (e.g., the above described weakened color stripe process and/or TV effective color stripe process), such programmability may include selecting TV scan line assignment for the modified color burst and/or unmodified color burst, phase angle, zone(s) of correct or incorrect phase, and/or duration of one or more zones of the color burst. Such modifications of the color burst are disclosed in U.S. Pat. Nos. 6,516,132 and 7,039,294, both incorporated by reference in their entireties.

Figure 13:
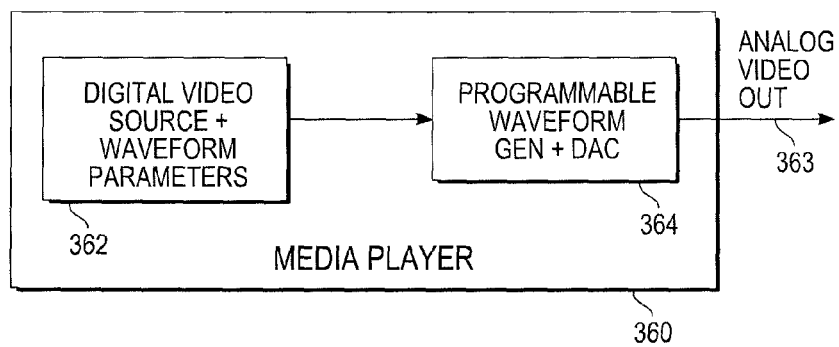

FIG. 13 illustrates a fourth embodiment of a media player 360. Here a digital video source 362 is coupled to a combined programmable waveform generator and DAC 364, where the digital video signal output from video source 362 includes, in addition to the video program signal, waveform parameter information (bit or bits) which allows programming of the copy protected waveform. The digital video source 362 thus may be solid state memory, optical disc, and/or magnetic disc or tape, which outputs the digital video signal containing programming information (or actual waveform(s)) for instance to provide flexible implementation of the copy protected waveform, which can change from one recorded media version to another. For example, not only are the copy protected waveforms or weakened color stripe signal output from the programmable waveform generator and DAC 364, the copy protected waveform(s) and/or modified color burst signal (the weakened and/or effective color stripe signal) may be updated to a new waveform to further improve copy protection effectiveness on a downstream VCR or compliant device, or to further improve playability. U.S. patent applications Ser. Nos. 10/968,487 and 11/228,757 describe examples of programmability of copy protection signals from the media or external sources (e.g., for a media player, updating its copy protection signal(s) and/or modification to the video signal is provided via any combination of media, memory device, storage device, Internet, digital network, computer, etc); both applications are incorporated by reference in their entirety.

In the media player examples of FIGS. 10-13, changes to the copy protection waveform may be implemented by commands from a source internal or external to the media player, such as a link to a transmission site or a "smart card" or similar (storage or memory) device thereby providing the programmability referred to above.

This disclosure is illustrative and not limiting. Further modifications will be apparent to those skilled in the art in light of this disclosure and are intended to fall within the scope of the appended claims.

The invention claimed is:

1. A method of providing a content control indication in a video signal output by a digital media player, comprising the acts of:
   providing a digital video signal from a video storage medium;
   providing a command;
   modifying the video signal in response to the command to include a weakened color stripe signal in selected scan lines of the video signal, the weakened color stripe signal having an incorrect color burst in a horizontal blanking interval of the selected scan lines, wherein the incorrect color burst includes more subcarrier cycles of correct phase angle than non-attenuated subcarrier cycles of incorrect phase angle, and is detectable by a color stripe process detector but inadequate to provide color copy protection effects in a video tape recording of the modified video signal, wherein the weakened color stripe signal is an indication of content control to inhibit recording of the modified video signal by a compliant recording apparatus;
   converting the modified video signal in a digital to analog converter to an analog video signal; and
   outputting the analog video signal.

2. The method of claim 1, wherein the video storage medium is one of an optical disc, a hard disc, a magnetic tape, or a solid state memory device.

3. The method of claim 1, wherein the output modified video signal conforms to an NTSC, PAL or SECAM television standard.

4. The method of claim 1, wherein the incorrect color burst includes as plurality of subcarrier cycles of incorrect phase angle that are attenuated.

5. The method of claim 1, wherein the incorrect color burst includes at least a first and a second portion, the first portion having subcarrier cycles of correct phase angle and the second portion having subcarrier cycles of incorrect phase angle.

6. The method of claim 1, wherein a length of the incorrect color burst is extended beyond that of a normal color burst.

7. The method of claim 1, further comprising the acts of:
   providing a copy protection signal; and inserting the copy protection signal into the output video signal.

8. The method of claim 1, further comprising detecting the command in the video signal.

9. The method of claim 1, wherein a phase angle shill of subcarrier cycles in the incorrect color burst is at least 120° from normal.

10. The method of claim 1, wherein the weakened color stripe signal encodes one of a plurality of content control states.

11. The method of claim 1, wherein the command is received from the video storage medium.

12. The method of claim 1, wherein the command is received from a source external to the digital media player.

13. A digital media player which provides a content control indication in a video signal, comprising:
   a video source which outputs a digital video signal;
   a signal generator coupled to the video source to generate, for selected scan lines of the video signal, a weakened color stripe signal having an incorrect color burst for a horizontal blanking interval of the selected scan lines, wherein the incorrect color burst includes more subcarrier cycles of correct phase angle than non-attenuated subcarrier cycles of incorrect phase angle, and is detectable by a color stripe process detector, but inadequate to provide color copy protection effects in a video tape recording of the modified video signal; and
   wherein the weakened color stripe signal is combined with the digital video signal:
   a digital to analog converter coupled to receive the digital video signal; and
   an output terminal coupled to the digital to analog converter for outputting an analog video signal, wherein the weakened color stripe signal in the analog video signal is an indication of content control to inhibit recording of the modified video signal by a compliant recording apparatus.

14. The player of claim 13, wherein the video source includes one of an optical disc drive, a hard disc drive, a magnetic tape drive, or a solid state memory device.

15. The player of claim 13, wherein the output analog video signal conforms to an NTSC, PAL, or SECAM television standard.

16. The player of claim 13, wherein the incorrect color burst includes a plurality of subcarrier cycles of incorrect phase angle that are attenuated.

17. The player of claim 13, wherein the incorrect color burst includes at least a first and a second portion, the first portion having subcarrier cycles of correct phase angle and the second portion having subcarrier cycles of incorrect phase angle.

18. The player of claim 13, wherein a length of the incorrect color burst is extended beyond that of a normal color burst.

19. The player of claim 13, wherein the signal generator further provides a copy protection signal.

20. The player of claim 13, further comprising: a control data reader or detector coupled to the signal generator and the video source to detect a command in the digital video signal.

21. The player of claim 13, wherein a phase angle shift of subcarrier cycles in the incorrect color burst is at least 120° from normal.

22. The player of claim 13, wherein the weakened color stripe signal encodes one of a plurality of content control states.

23. The player of claim 13, wherein the signal generator is programmable from a source external to the digital media player.

* * * * *